US012320161B2

(12) United States Patent
Grove

(10) Patent No.: US 12,320,161 B2
(45) Date of Patent: Jun. 3, 2025

(54) ANTI-THEFT PERFORATED WALL BOARD LOCK

(71) Applicant: Wall Control, Inc., Tucker, GA (US)

(72) Inventor: Richard Joseph Grove, Loganville, GA (US)

(73) Assignee: Wall Control, Inc., Tucker, GA (US)

( * ) Notice: Subject to any disclaimer, the term of this patent is extended or adjusted under 35 U.S.C. 154(b) by 71 days.

(21) Appl. No.: 18/130,456

(22) Filed: Apr. 4, 2023

(65) Prior Publication Data

US 2023/0349198 A1 Nov. 2, 2023

Related U.S. Application Data

(60) Provisional application No. 63/327,096, filed on Apr. 4, 2022.

(51) Int. Cl.
*E05B 73/00* (2006.01)

(52) U.S. Cl.
CPC .................................... *E05B 73/00* (2013.01)

(58) Field of Classification Search
CPC ...... A47F 5/0861; A47F 7/024; A47F 5/0815; Y10T 70/5009; Y10T 70/5022; Y10T 70/5027; E05B 73/00
USPC ............................ 70/57, 58, 232; 211/87, 88
See application file for complete search history.

(56) References Cited

U.S. PATENT DOCUMENTS

| | | | | |
|---|---|---|---|---|
| 4,289,242 A * | 9/1981 | Kenyon | A47F 5/0861 | 211/59.1 |
| 4,308,733 A * | 1/1982 | Tampa | B62D 43/007 | 411/209 |
| 6,622,979 B2 * | 9/2003 | Valiulis | A47F 5/0861 | 70/57.1 |
| 8,534,469 B2 * | 9/2013 | Northrup, Jr. | A47F 5/0861 | 211/59.1 |

* cited by examiner

*Primary Examiner* — Suzanne L Barrett
(74) *Attorney, Agent, or Firm* — Johnson, Marcou, Isaacs & Nix, LLC

(57) ABSTRACT

A panel lock assembly securely attaches an object to a perforated wall board panel. The panel lock assembly comprises a pin that hooks through an opening in the panel, a brace that fits over the pin next to the panel, and a lock that fits through an opening in the pin. The lock prevents removal of the brace from the pin, which prevents removal of the pin from the panel. Objects can be secured by the lock to secure the object to the pin and therefore to the panel. In this manner, theft of objects secured to the panel can be deterred.

20 Claims, 10 Drawing Sheets

ANTI-THEFT PERFORATED WALL BOARD LOCK

CROSS REFERENCE TO RELATED APPLICATIONS

This application claims priority to U.S. Provisional Patent Application No. 63/327,096 filed Apr. 4, 2022 and titled "Anti-Theft Perforated Wall Board Lock." The entire contents of the above-identified priority application are hereby fully incorporated herein by reference.

TECHNICAL FIELD

The technology disclosed in this application relates to wall mounting systems and, more particularly, to a lock assembly that securely attaches an object to perforated wall board.

BACKGROUND

Conventional wall storage systems include brackets, trays, bins, shelves, hooks, or other storage components mounted to storage panels that attach to a wall, workbench, or other surface. The panels have various configurations of holes and/or slots in the surface of the panels. The storage components include brackets that mate with the holes/slots to attach to the panels. The panels may be referred to as wall board, pegboard, perforated wall board, perforated paneling board, or any other suitable name referencing storage panels with configurations of holes, slots, and/or other apertures.

The panels may include an L-shaped flange, or other extension such as a channel, along edges of the panels, such that mounting the panels with the extension next to a wall results in the panel surface being disposed with a gap between the panel surface and the wall. In this manner, the storage components may be mated with the holes/slots on the panel without interference from the wall. The panels may be disposed in any suitable configuration on the wall, including a three-dimensional configuration.

Objects are suspended on the panels via the storage components attached to the panels. For example, various tools can be hung from hooks attached to the panels, fasteners can be stored in bins attached to the panels, standing objects (for example, spray paint cans) can be stored on shelves attached to the panels. Many different types of storage components are available to attach to the panels to store various objects. Any suitable object can be stored on the panel, such as tools, fasteners, paint cans, oil cans, radios, power adapters/chargers, etc.

All objects stored on the panels via the storage components are not securely attached to the panel. For example, tools hang from hooks on the panels, sit on shelves on the panels, or sit in bins attached to the panels. Accordingly, objects stored on the panels are subject to theft.

Conventional methods to securely store objects on the panels are cumbersome and expensive. For example, a user must first install a lockable cabinet on a wall and then install a wall panel inside the cabinet. In this manner, objects stored on the panel can be locked in the cabinet by locking the cabinet doors. Conventional systems cannot secure an object to a panel to protect the object from theft.

BRIEF DESCRIPTION OF THE DRAWINGS

FIG. 2, comprising

FIG. 3, comprising

DETAILED DESCRIPTION

The innovations described herein relate to a panel lock assembly that securely attaches an object to a perforated wall board panel. The panel lock assembly comprises a pin that hooks through an opening in the panel, a brace that fits over the pin next to the panel, and a lock that fits through an opening in the pin. The lock prevents removal of the brace from the pin, which prevents removal of the pin from the panel. Objects can be secured by the lock to secure the object to the pin and therefore to the panel. In this manner, theft of objects secured to the panel can be deterred.

Exemplary perforated wall board locks and corresponding methods according to various aspects of the innovations discussed herein will now be described with reference to the figures. Like numerals represent like (but not necessarily identical) elements throughout the figures.

Figure 1A:
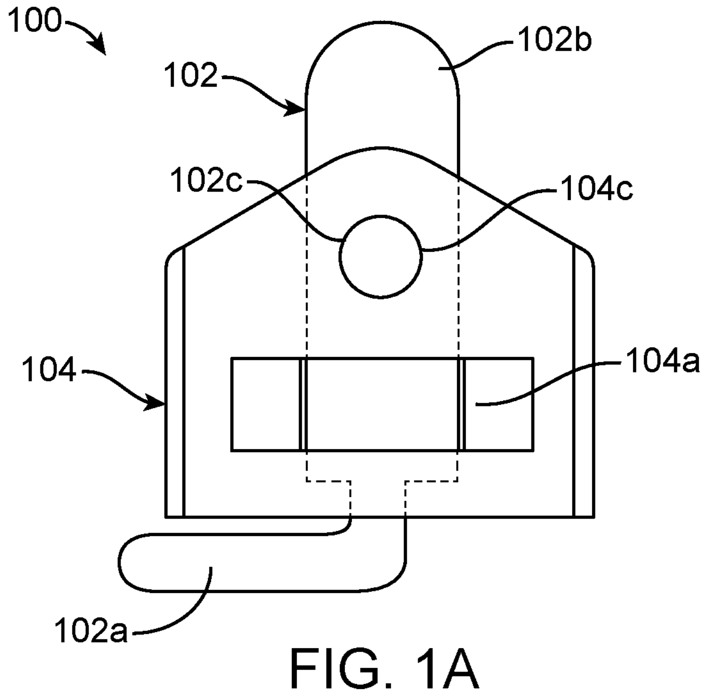
FIGS. 1A and 1*i*, depicts a top view and an end view, respectively, of a panel lock assembly comprising an L-pin and a brace.
Figure 1B:
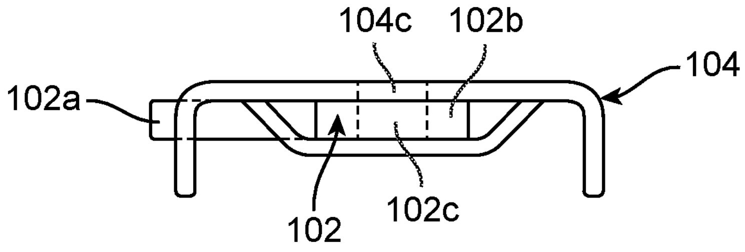
FIG. 1, comprising
Figure 2A:
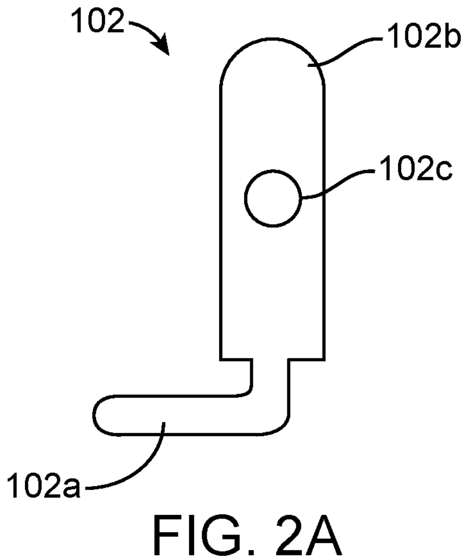
FIGS. 2A and 2B, depicts a top view and a side view, respectively, of the L-pin of the panel lock assembly according to certain examples.
Figure 2B:
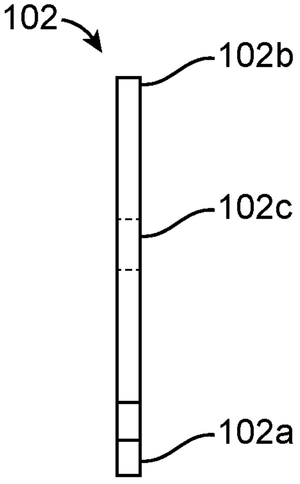
Figure 3A:
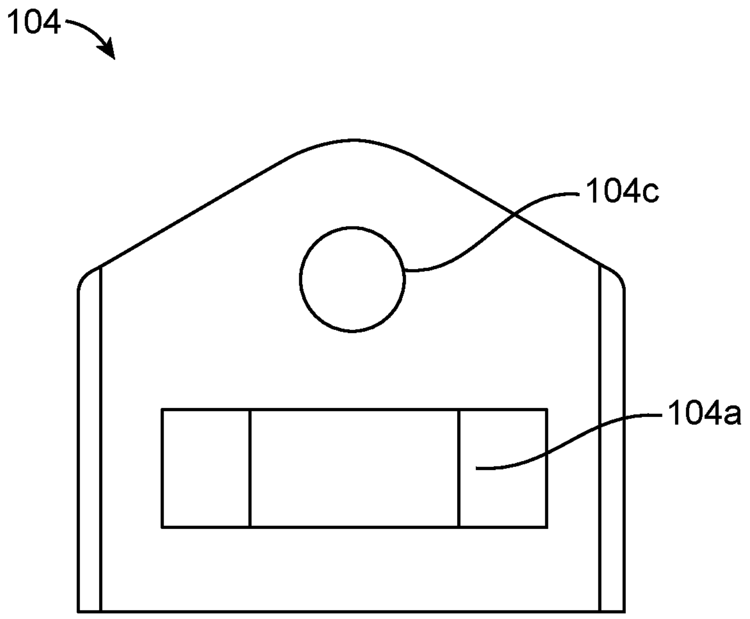
FIGS. 3A and 3B, depicts a top view and an end view, respectively, of the brace of the panel lock assembly according to certain examples.
Figure 3B:
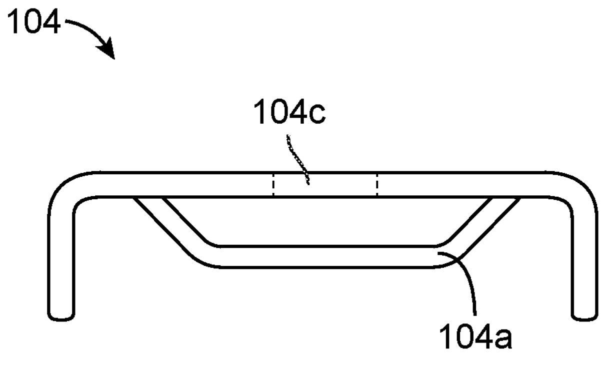

FIGS. 1-3 illustrate a perforated wall board panel lock assembly 100 comprising an L-shaped pin 102 (hereinafter an "L-pin") and a brace 104 according to certain examples. FIG. 1, comprising FIGS. 1A and 1, depicts a top view and an end view, respectively, of a panel lock assembly 100 comprising an L-pin 102 and a brace 104 according to certain examples. FIG. 2, comprising FIGS. 2A and 2B, depicts a top view and a side view, respectively, of the L-pin 102 of the panel lock assembly 100 according to certain examples. FIG. 3, comprising FIGS. 3A and 3B, depicts a top view and an end view, respectively, of the brace 104 of the panel lock assembly 100 according to certain examples.

As shown in FIGS. 1-3, a panel lock assembly 100 comprises an L-pin 102 and a brace 104. The brace 104 slidably engages with the L-pin 102.

The L-pin 102 comprises a panel engagement portion 102*a* and a lock mounting portion 102*b*. The panel engagement portion 102*a* is disposed at an angle with regard to the lock mounting portion 102*b*. As shown in FIGS. 1 and 2, the angle is 90 degrees. However, any suitable angle can be utilized such that the panel engagement portion 102*a* fits through an opening in a panel while allowing the lock mounting portion 102*b* to extend from the insertion side of the panel, as discussed further hereinafter with reference to FIGS. 4-11. The panel engagement portion 102*a* is sized to fit through an opening in the panel. As shown in FIGS. 1 and 2, the lock mounting portion 102*b* is sized bigger than the panel engagement portion 102*a* and bigger than the opening in the panel, which prevents inserting the L-pin 102 entirely through the opening in the panel. In this case, the lock mounting portion 102*b* is sized such that it will not fit through the opening in the panel. However, the lock mounting portion 102*b* does not have to be bigger than the panel engagement portion 102*a* or the opening in the panel, as the brace 104 prevents inserting the L-pin 102 entirely through the panel when engaged with the L-pin 102. In this case, the lock mounting portion 102*b* can be sized such that it will fit through the opening in the panel.

The L-pin 102 also comprises an aperture 102*c* disposed in the lock mounting portion 102*b*.

As shown in FIGS. 1 and 3, the brace 104 comprises a loop 104*a* sized to accommodate the lock mounting portion 102*b* of the L-pin 102. The brace 104 slidably engages with the L-pin 102 by sliding the loop 104*a* of the brace 104 over the lock mounting portion 102*b* of the L-pin 102. The loop 104*a* is shown as a continuous loop. However, the loop 104*a* can be sized to engage sufficiently with the L-pin 102 without being a continuous loop. For example, the loop 104*a* can comprise two tabs that engage sufficiently around the L-pin 102 to secure the brace 104 to the L-pin 102, and the two tabs may not be continuous between the two tabs.

The brace 104 also comprises an aperture 104*c*. When the brace 104 is engaged with the L-pin 102, the aperture 104*c* of the brace 104 aligns with the aperture 102*c* of the L-pin 102, as shown in FIG. 1A. In this manner, a lock can be inserted through both apertures 102*c*, 104*c* to secure the panel lock assembly 100 to a panel.

Any suitable size panel lock assembly 100 can be utilized. For example, the panel lock assembly 100 can be relatively bigger when paired with larger openings in the panel, or the panel lock assembly 100 can be relatively smaller when paired with smaller openings in the panel.

Figure 10:
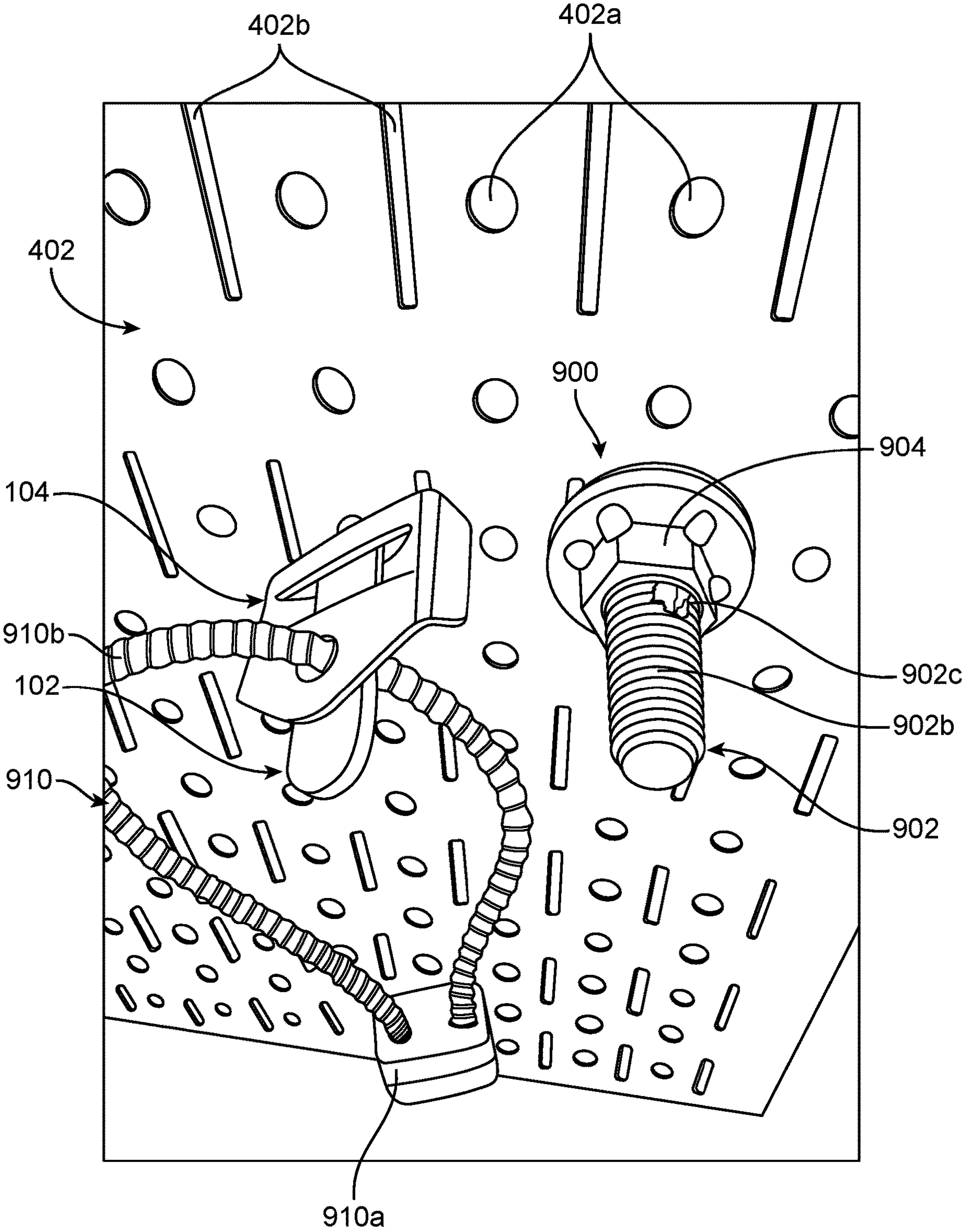
FIGS. 10 and 11 illustrate additional views of the panel lock assembly secured to the perforated wall board panel.
Figure 11:
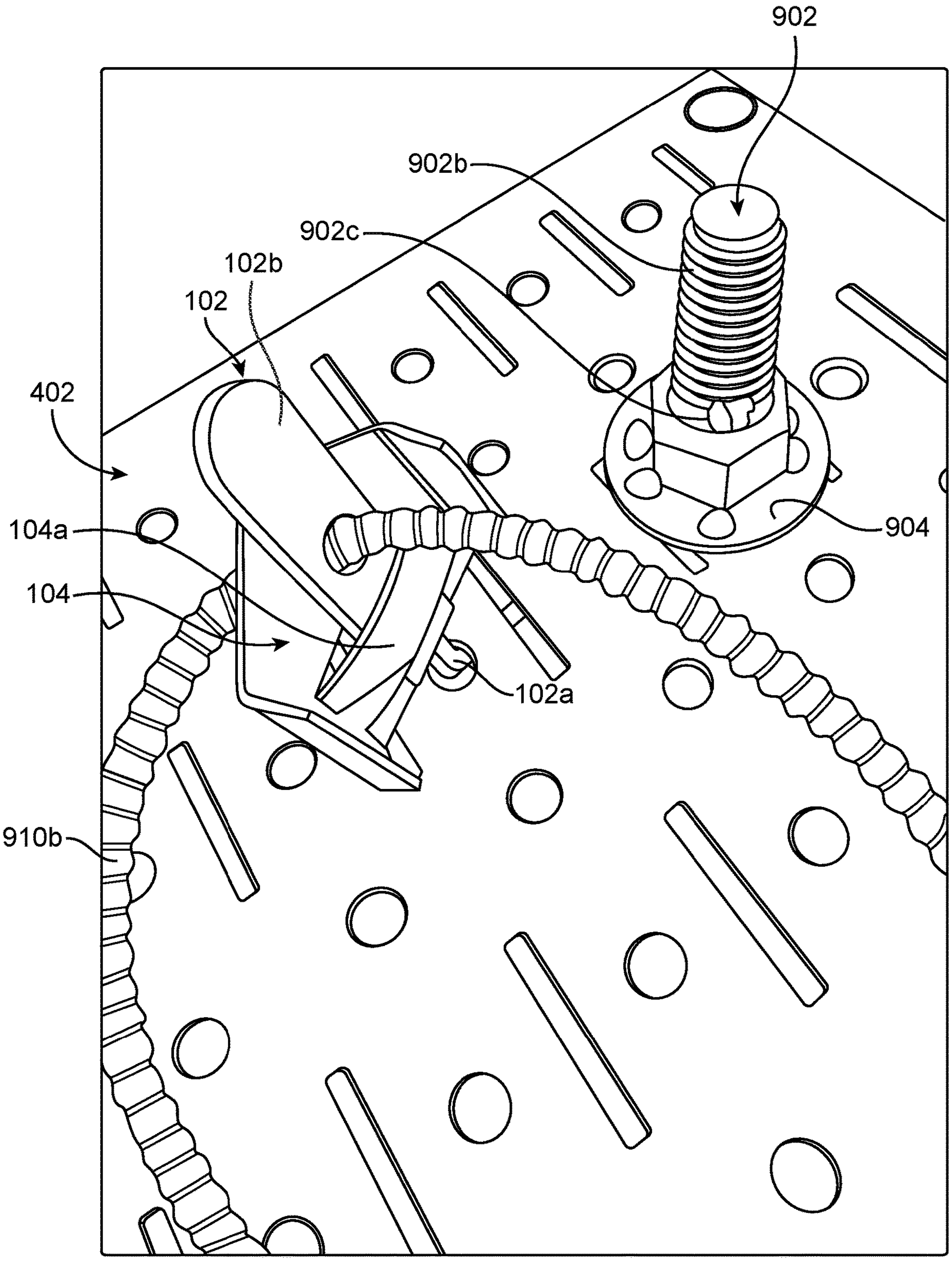

Operation of the panel lock assembly 100 will now be described with reference to FIGS. 4-11. FIGS. 4-9 illustrate a sequential operation to secure an object to a perforated wall board panel using the panel lock assembly 100, including the L-pin 102 and the brace 104. FIGS. 10 and 11 illustrate additional views of a panel lock assembly 100 secured to the perforated wall board panel.

A perforated wall board panel 402 is depicted in FIGS. 4-11. In practice, the panel 402 can be attached to a wall, work bench, or other surface by attaching the panel to the surface. The panel 402 comprises various openings, such as holes 402*a*, slots 402*b*, or other apertures therein to receive storage components, such as the panel lock assembly 100 or other suitable component. The openings can be any suitable shape, such as round, oval, square, rectangular, slotted, or any other suitable shape.

The panel 402 can be attached directly to the wall, work bench, or other surface or to mounting brackets that can be attached to the surface. Any suitable fastener can be used to mount the panel 402 or mounting brackets to the surface and/or to each other. For example, the panel 402 and/or mounting can be bolted, screwed, glued, or otherwise attached to the surface or each other. Additionally, the panel 402/mounting brackets can be attached to the wall, work bench, or other surface via any suitable method, such as using bolts, screws, or any other suitable wall attachment (for example, molly bolts).

The panel 402 can be any suitable wall mounting panel. For example, the panel 402 can be conventional or custom perforated wall panels of any desired size, configuration, shape, or manufacturer and made from any suitable material, such as metal, wood, fiber, or other suitable material. The panel 402 can be mounted flat against the surface or to mounting brackets that attach to the surface. The panel 402 can include L-shaped flanges or other extensions around at least one side of the perimeter of the panel 402, which facilitates mounting the panel surface in a spaced position from a mounting surface (such as a wall) to which the panel 402 is attached.

Figure 4:
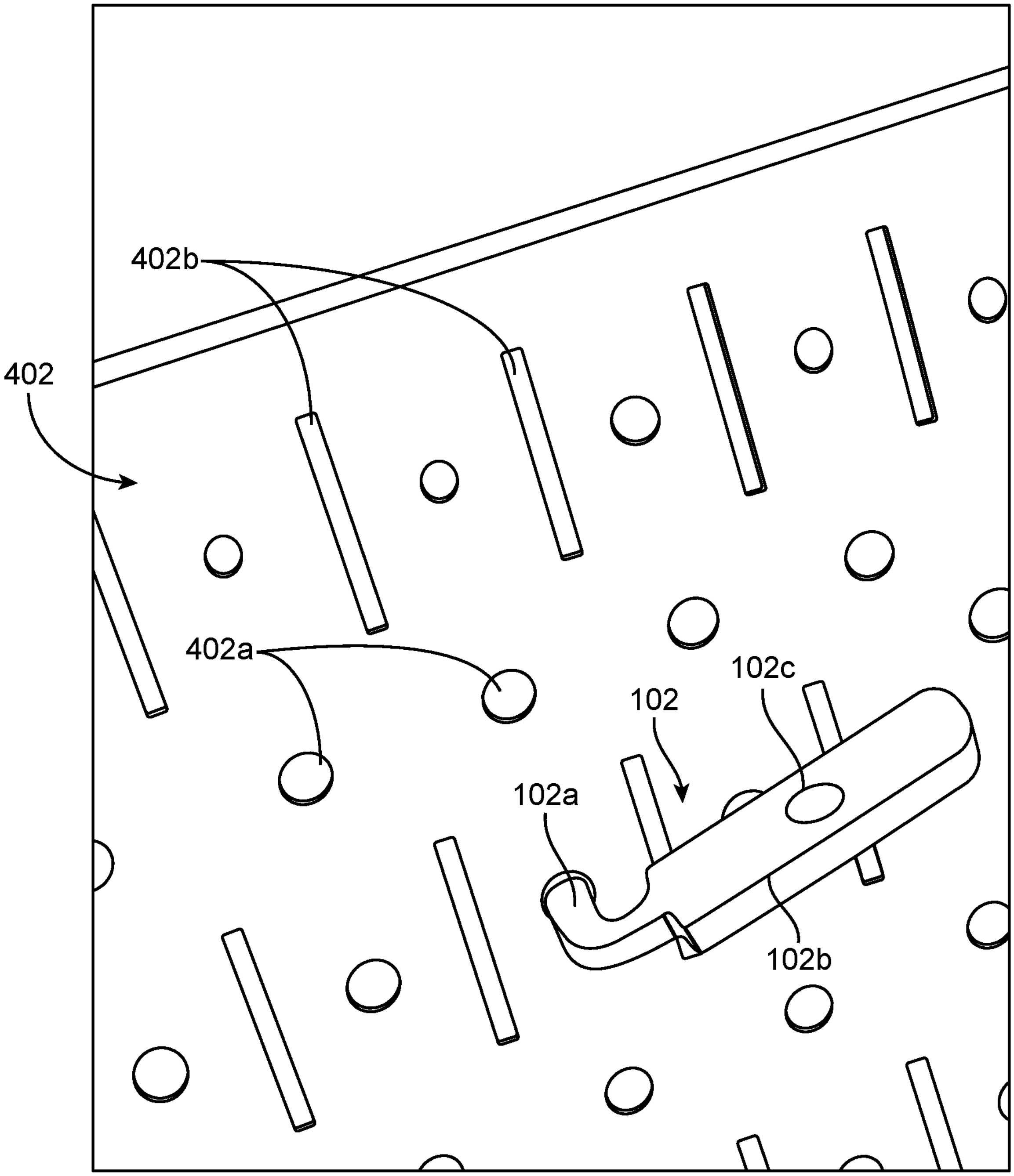
FIGS. 4-9 illustrate a sequential operation to secure an object to a perforated wall board panel using the panel lock assembly.

FIG. 4 illustrates a first step in mounting the panel lock assembly 100 to the panel 402. As shown in FIG. 4, the L-pin 102 of the panel lock assembly 100 is positioned such that a longitudinal axis of the panel engagement portion 102*a* is aligned orthogonal to a hole 402*a* in a front surface of the panel 402 and such that a longitudinal axis of the lock mounting portion 102*b* is aligned parallel with the front surface of the panel 402. The L-pin 102 is pushed toward the panel 402 to insert a portion of the panel engagement portion 102*a* into the hole 402*a* of the panel 402.

Figure 5:
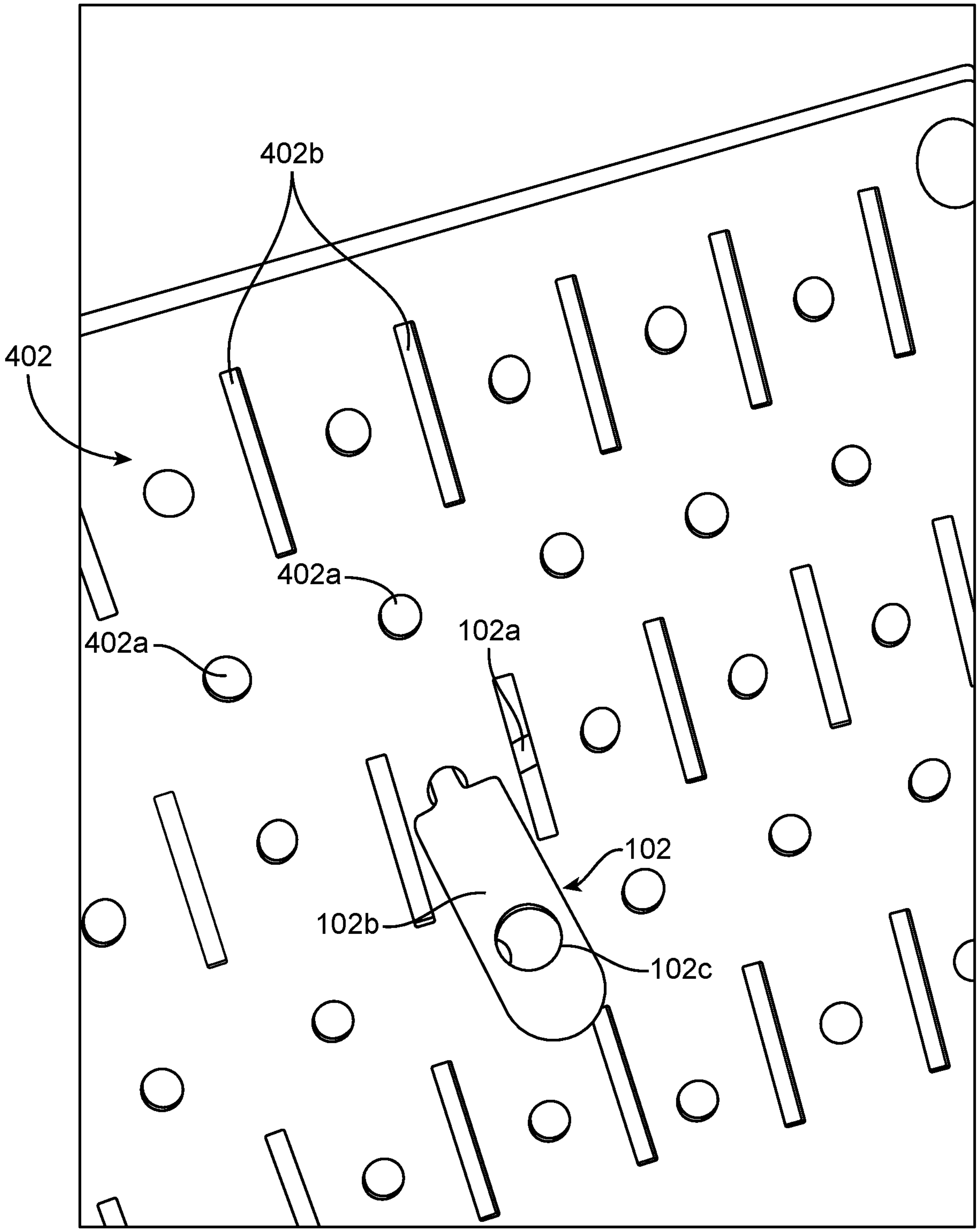

FIG. 5 illustrates a second step in mounting the panel lock assembly 100 to the panel 402. As shown in FIG. 5, the L-pin 102 is rotated away from the panel 402 by moving the lock mounting portion 102*b* away from the panel 402 such that the longitudinal axis of the lock mounting portion 102*b* moves from the initial position of parallel with the surface of the panel 402 (as shown in FIG. 4) to a secondary position of orthogonal to the surface of the panel 402. Simultaneously with rotating the lock mounting portion 102*b*, the panel engagement portion 102*a* is inserted into the hole 402*a* of the panel 402 while rotating the panel engagement portion 102*a* toward a back surface of the panel 402, such as the longitudinal axis of the panel engagement portion 102*a* moves from the initial position of orthogonal to the hole 402*a* of the panel 402 (as shown in FIG. 4) to a secondary position of parallel to the back surface of the panel 402.

The amount of movement of the L-pin 102 relative to the panel 402 while inserting the L-pin 102 into the hole 402*a* of the panel 402 is based on the angle of the panel engagement portion 102*a* relative to the lock mounting portion 102*b*. For example, when the angle between the portions 102*a*, 102*b* is 90 degrees, the L-pin 102 is rotated 90 degrees when inserted into the panel 402. Relatively less rotation would be used for a larger angle between the portions 102*a*, 102*b*, and relatively more rotation would be used for a smaller angle between the portions 102*a*, 102*b*.

FIG. 5 also illustrates a width of the lock mounting portion 102*b* of the L-pin 102 being larger than the hole 402*a* of the panel 402. Although illustrated as being inserted into a hole 402*a* of the panel 402, the panel lock assembly 100 can be inserted into any suitable aperture in the panel 400. In each case, the panel lock assembly 100 can have components that are sized corresponding to a size of the particular opening in the panel 400.

Figure 6:
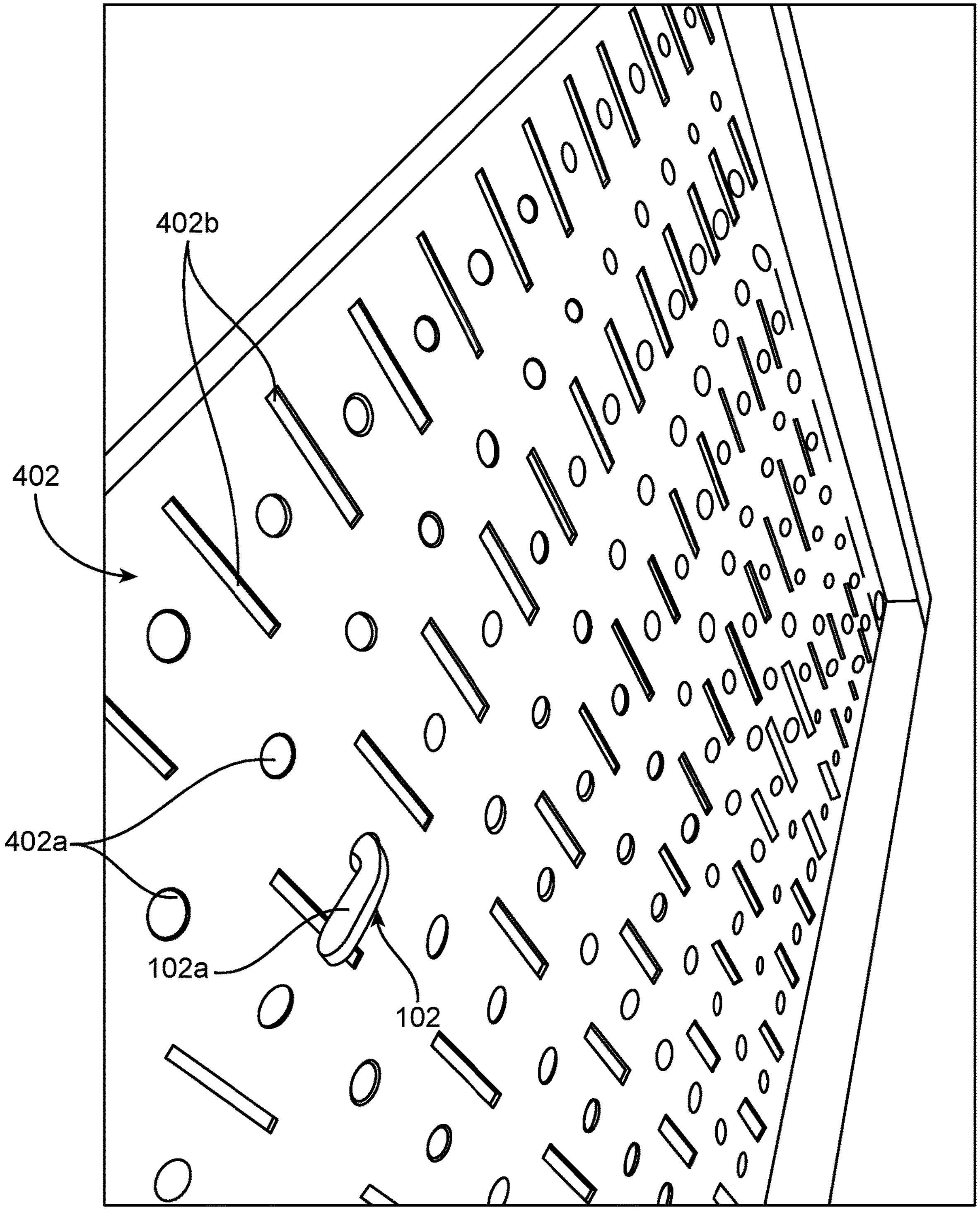

FIG. 6 illustrates the panel engagement portion 102*a* of the L-pin disposed behind the panel 402 after insertion through the hole 402*a* of the panel 402. As shown, the longitudinal axis of the panel engagement portion 102*a* is parallel to the back surface of the panel 402, and the panel engagement portion 102*a* is in contact with the back surface of the panel 402.

Figure 7:
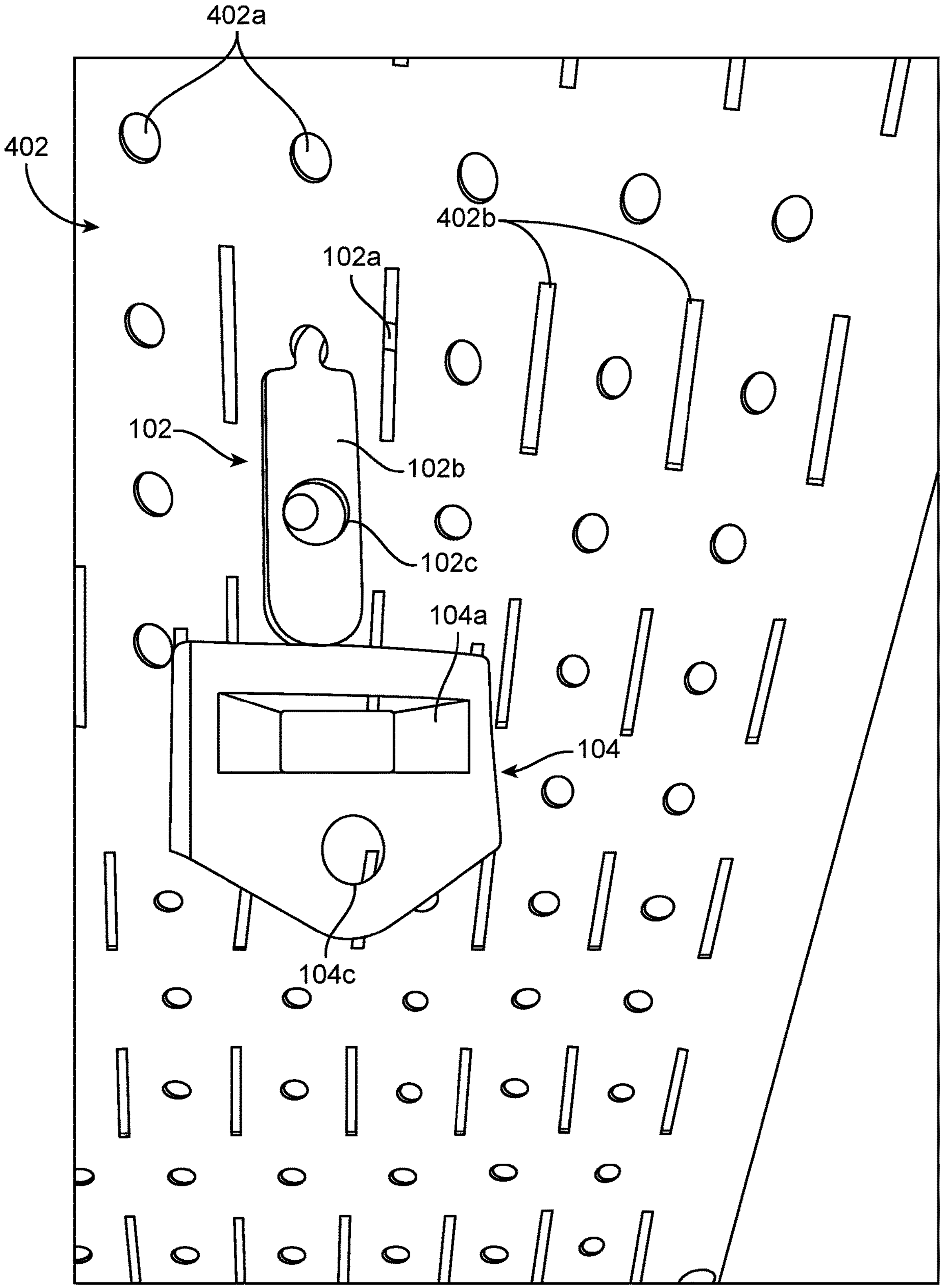
Figure 8:
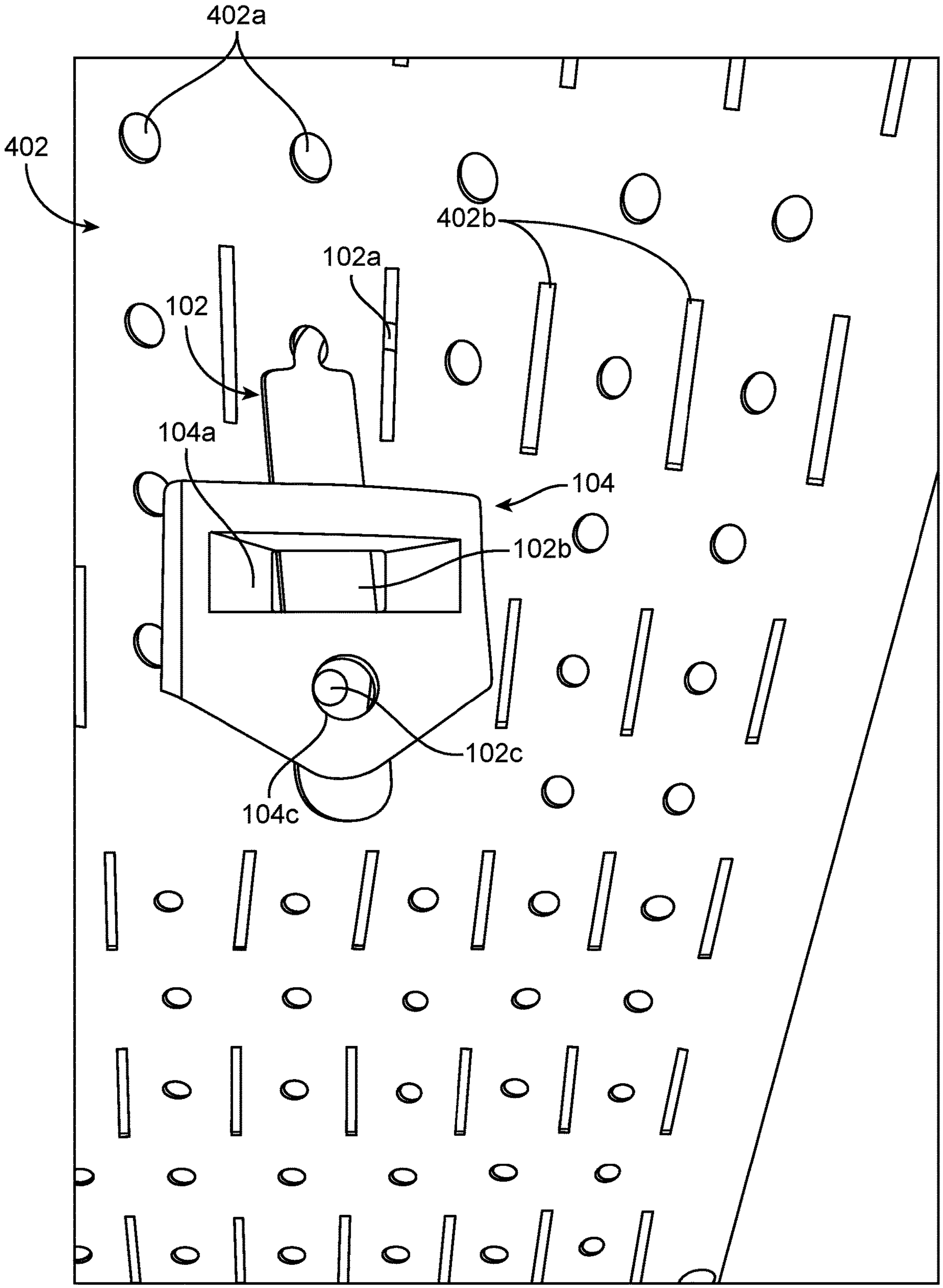

FIGS. 7 and 8 illustrate third and fourth steps, respectively, in mounting the panel lock assembly 100 to the panel 402. As shown in FIG. 7, the brace 104 is positioned such that the loop 104*a* of the brace 104 is aligned with the lock mounting portion 102*b* of the L-pin 102. Then, as shown in FIG. 8, the lock mounting portion 102*b* of the L-pin 102 is inserted into the loop 104*a* of the brace 104, and the brace 104 is slid over the lock mounting portion 102*b* of the L-pin 102 toward the panel 402 until the apertures 102*c*, 104*c* are aligned. Complete or partial alignment of the apertures 102*c*, 104*c* is suitable depending on a size of a lock to be inserted into the apertures 102*c*, 104*c*.

Figure 9:
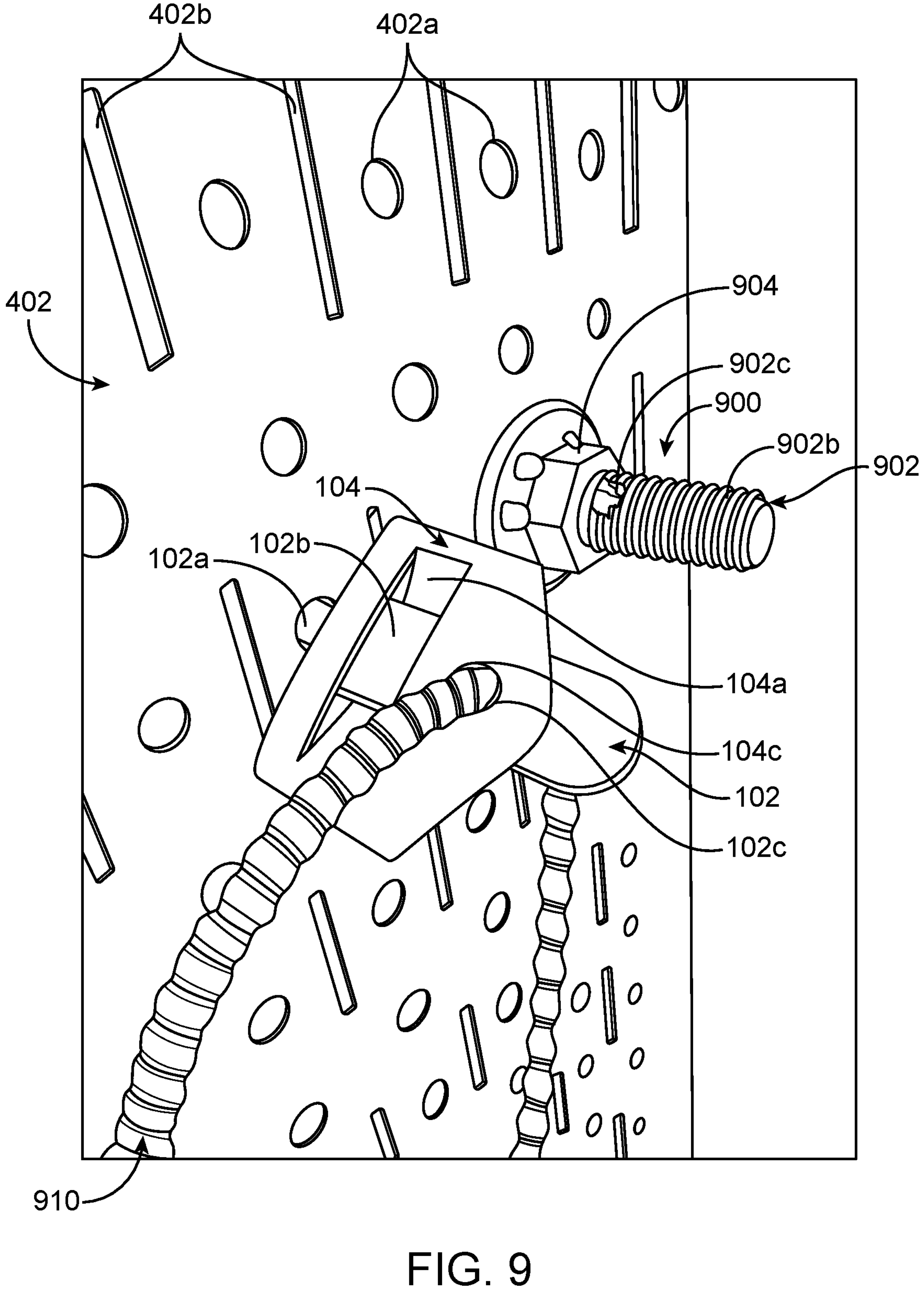

FIG. 9 illustrates a fifth step in mounting the panel lock assembly 100 to the panel 402. As shown in FIG. 9, a lock 910 is inserted through the apertures 102*c*, 104*c* to secure the L-pin 102 and the brace 104 together, thereby securing the panel lock assembly 100 to the panel 402. As shown in FIG. 9, the brace 104 is secured on the L-pin 102 such that the brace 104 is close enough to the panel 402 to prevent pulling the L-pin 102 from the hole 402*a* of the panel 402. The brace 104 may be disposed in contact with the front surface of the panel 402 to provide a more secure assembly. However, a desired space may be provided between the brace 104 and the front surface of the panel 402 to allow movement of the panel lock assembly 100 while still preventing removal of the panel lock assembly 100 from the hole 402 of the panel 400. The lock 910 prevents or limits movement of the brace 104 relative to the L-pin 102, thereby maintaining the brace 104 close to the panel 402 to prevent removal of the L-pin 102 from the panel 402.

FIGS. 10 and 11 are additional views illustrating engagement of the lock 910 with the panel lock assembly 100. The lock 910 comprises a cable 910*b* extending through the apertures 102*c*, 104*c* of the panel lock assembly 100. The lock 910 also comprises a lock member 910*a* that secures ends of the cable 910*b*. In this manner, the lock 910 cannot be removed from the apertures 102*c*, 104*c* of the panel lock assembly 100, and the panel lock assembly 100 remains secured to the panel 402.

While the panel lock assembly 100 is secured to the panel 402, the lock 910 also can be used to secure objects to the panel 402. For example, the cable 910*b* also can be inserted through any suitable aperture of an object before securing the ends of the cable 910*b* with the lock member 910*a*. In this manner, the object also is secured to the panel 402.

Many objects have an opening through which the cable 910*b* can be inserted and locked via the lock member 910*a* to secure the object to the panel 402. For example, wrenches have openings sized for particular nuts; tools have holes made to hang the tools on a conventional panel board hook; and a pistol has a trigger guard creating a ring around the trigger. Any suitable opening in an object can be utilized with the lock 910 to secure the object to the panel 402 via the panel lock assembly 100.

Although shown as a cable lock 910 in FIGS. 9-11, any suitable lock can be utilized. For example, the cable 910*b* can have a length allowing insertion through multiple objects to secure multiple objects to the panel 402. Additionally, a padlock having a suitably sized shackle can be used. In this case, the shackle is long enough to allow insertion through an opening in an object and insertion through the apertures 102*c*, 104*c* of the panel lock assembly 100.

FIGS. 9-11 also illustrate an alternative panel lock assembly 900 according to certain examples. The panel lock assembly 900 comprises an L-pin 902 and a nut 904.

The L-pin 902 comprises a panel engagement portion similar to the panel engagement portion 102*a* of the L-pin 100 described previously. The panel engagement portion of the L-pin 902 is hidden behind the panel 402 and therefore is not visible in FIGS. 9-11.

The L-pin 902 also comprises a lock mounting portion 902*b* that extends from the front surface of the panel 402 when secured to the panel 402. The lock mounting portion 902*b* further comprises an aperture 902*c*.

The panel lock assembly 900 also comprises a brace 904 that is removably engageable with the lock mounting portion 902*b* of the panel lock assembly 900. As shown in FIGS. 9-11, the lock mounting portion 902*b* comprises threads, and the brace 904 comprises a nut with corresponding threads that screws onto the threads of the lock mounting portion 902*b*. Alternatively, the brace 904 can be sized to fit over the lock mounting portion 902*b* without engaging with the threads on the lock mounting portion 902*b*. In this case, the threads are optional, and the brace 904 can comprise a washer, an oversized nut, or other suitable retainer.

The brace 904 is placed on the lock mounting portion 902*b* until the brace 904 is close enough to the panel 402 to retain the L-pin 902 to the panel 402 and until the aperture 902*c* is exposed on a side of the brace 904 opposite the panel 402. Then, a lock can be inserted through the aperture 902*c* to secure objects to the panel 402, as discussed previously with reference to the panel lock assembly 100. Additionally, similarly to the panel lock assembly 100 described previously, the brace 904 can comprise an aperture (not illustrated) that aligns with the aperture 902*c* of the pin 902, and the lock 910 can be inserted through both apertures as described previously with reference to the panel lock assembly 100.

The components described herein can be formed from any suitable material to provide a desired strength of the panel lock assembly, such as metal, plastic, any other suitable material, or any suitable combinations thereof.

The example systems, methods, and components described in the embodiments presented previously are illustrative, and, in alternative embodiments, certain components can be combined in a different order, omitted entirely, and/or combined between different example embodiments, and/or certain additional components can be added, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person having ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A panel lock assembly for perforated wall panels, comprising:

a pin comprising a first portion and a second portion extending away from the first portion, the first portion of the pin being disposed at an angle to the second portion of the pin and sized to fit in an aperture of a perforated wall panel, and the second portion of the pin comprising a first aperture therein; and a brace configured to engage around the second portion of the pin and comprising a second aperture therein, the second aperture of the brace aligning with the first aperture of the pin when the brace engages the pin, alignment of the second aperture of the brace with the first aperture of the pin positioning the brace relative to the first portion of the pin to sandwich the perforated wall panel between the brace and the first portion of the pin such that removal of the pin from the perforated wall panel is prevented when alignment of the apertures is maintained.

2. The panel lock assembly according to claim 1, further comprising a lock comprising a portion that extends through the first and second apertures when the first and second apertures are aligned to secure the brace to the pin aid to secure the pin to the perforated wall panel to prevent removal thereof.

3. The panel lock assembly according to claim 1, further comprising the perforated wall panel.

4. The panel lock assembly according to claim 1, the first portion of the pin disposed at an angle of 90 degrees to the second portion of the pin.

5. The panel lock assembly according to claim 1, the second portion of the pin being sized such that it will not fit through the aperture in the perforated wall panel.

6. The panel lock assembly according to claim 1, the pin being an L-shaped pin based on the placement of the first portion of the pin with regard to the second portion of the pin.

7. The panel lock assembly according to claim 1, the brace comprising a loop that slidably engages with the second portion of the pin.

8. The panel lock assembly according to claim 7, the loop being continuous.

9. The panel lock assembly according to claim 7, the loop comprising at least one discontinuity.

10. The panel lock assembly according to claim 9, the loop comprising two tabs with the discontinuity between the tabs.

11. The panel lock assembly according to claim 1, the second portion of the pin comprising first threads, and the brace comprising second threads that engage with the first threads of the pin.

12. A panel lock assembly for perforated wall panels, comprising:

a pin comprising a first portion and a second portion, the first portion of the pin being disposed at an angle to the second portion of the pin and sized to fit in an aperture of a perforated wall panel, and the second portion of the pin comprising a first aperture therein; and a brace configured to engage around the second portion of the pin and to move on the pin past the first aperture of the pin when moved on the second portion of the pin toward the first portion of the pin, movement of the brace past the first aperture of the pin positioning the brace relative to the first portion of the pin to sandwich the perforated wall panel between the brace and the first portion of the pin such that removal of the pin from the perforated wall panel is prevented when the position of the brace past the first aperture oft the pin is maintained.

13. The panel lock assembly according to claim 12, further comprising a lock comprising a portion that extends through the first aperture to secure the brace to the pin when the brace is moved past the first aperture of the pin and to secure the pin to the perforated wall panel to prevent removal thereof.

14. The panel lock assembly according to claim 12, the first portion of the pin disposed at an angle of 90 degrees to the second portion of the pin.

15. The panel lock assembly according to claim 12, the second portion of the pin being sized such that it will not fit through the aperture in the perforated wall panel.

16. The panel lock assembly according to claim 12, the pin being an L-shaped pin based on the placement of the first portion of the pin with regard to the second portion of the pin.

17. The panel lock assembly according to claim 12, the brace comprising a loop that slidably engages with the second portion of the pin.

18. The panel lock assembly according to claim 17, the loop being continuous.

19. The panel lock assembly according to claim 12, the second portion of the pin comprising first threads, and the brace comprising second threads that engage with the first threads of the pin.

20. A method to secure objects to perforated wall panels, comprising;

inserting a first portion of an L-shaped pin into an aperture in a front surface of a perforated wall panel;

rotating a second portion of the L-shaped pin away from the front surface of the panel as the first portion of the L-shaped pin is inserted into the aperture in the panel, thereby rotating the first portion of the L-shaped pin to contact a back surface of the panel;

engaging a brace over the second portion of the L-shaped pin from an end of the L-shaped pin disposed away from the front surface of the panel toward the front surface of the panel;

aligning a first aperture in the L-shaped pin with a second aperture in the brace as the brace is engaged over the second portion of the L-shaped pin, thereby positioning the brace relative to the first portion of the pin to sandwich the perforated wall panel between the brace and the first portion of the pin;

inserting a lock through an opening in an object and through the first and second apertures; and locking the lock to secure the L-shaped pin to the panel and the object to the L-shaped pin.

* * * * *